Patented June 29, 1937

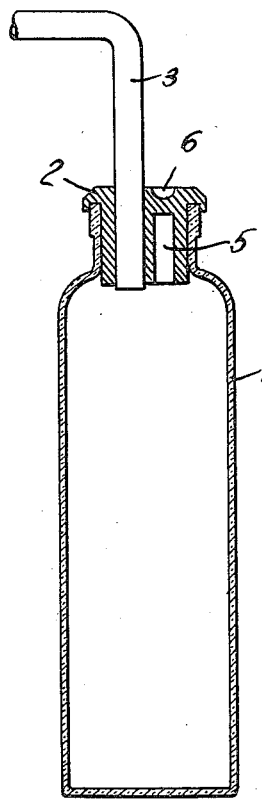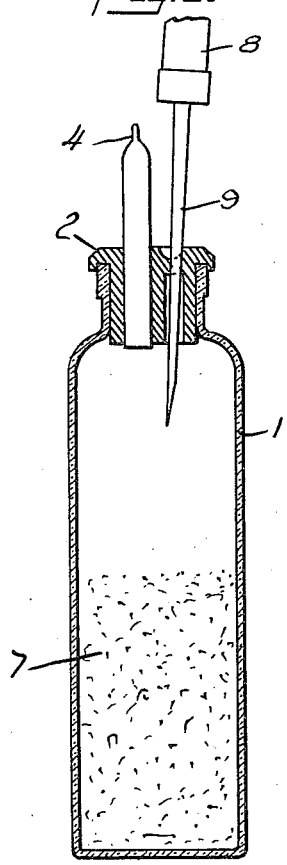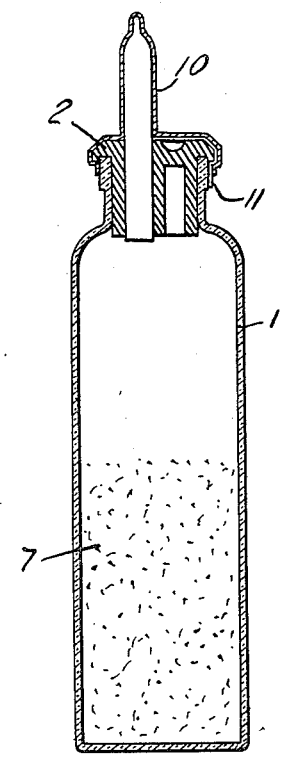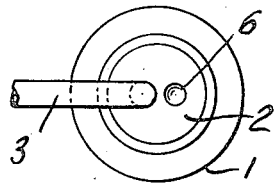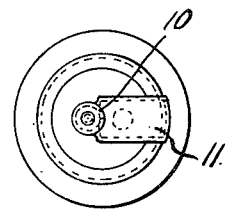

2,085,392

UNITED STATES PATENT OFFICE 2,085,392

CONTAINER WITH LYOPHILIC BIOLOGICALLY-ACTIVE SUBSTANCES, ETC.

John Reichel, Philadelphia, Pa., assignor to Sharp & Dohme, Incorporated, Philadelphia, Pa., a corporation of Maryland Application December 19, 1934, Serial No. 758,319

3 Claims. (Cl. 215—47)

This invention relates to improvements in the storing and handling of lyophilic biologically active substances, and includes a new combination of the new container and the lyophilic substance contained therein in an evacuated state.

In my prior application Serial No. 706,547, now Patent No. 2,066,302, patented December 29, 1936, I have described the production of new lyophilic biologically active substances such as sera, etc. by rapid freezing of the fresh liquid substance, removal of water from the solid frozen material without melting or softening thereof by the application of a high vacuum and regulated warming of the material without melting or softening. In my prior application Serial No. 709,191, I have described the preservation of such lyophilic products in sealed containers, and have described various containers suitable therefor.

The present invention relates to improvements in containers for such lyophilic products which permit such products to be readily prepared in the container, as a final container of the products, and the preservation of the lyophilic products in an evacuated state, and the restoration of the product to a liquid state, in the container, without destroying the vacuum.

The container itself may be an ordinary glass bottle of a size adapted to contain a unit amount or a larger amount of the lyophilic material, which bottle is provided with a new and improved rubber stopper and a sealed tube extending therethrough.

The rubber stopper has a hole therethrough for the insertion of a glass tube, through which the vacuum is applied during the process of producing the lyophilic product in the container, and which tube may be sealed so that the final container is a sealed container. The rubber stopper also contains a passage extending a considerable distance, but not the entire distance, through the length of the stopper, to provide a thin, easily puncturable portion, through which, for example, a hypodermic syringe needle can be readily inserted. The stopper is also so constructed that, when the container is finally sealed in an evacuated state, the location of the thin, easily perforable, portion of the stopper will be visually indicated, so that the stopper may be perforated with certainty at the proper location.

The invention will be further described in connection with the accompanying drawing, in which Fig. 1 shows in vertical section an empty container having the rubber stopper applied thereto and a glass tubing extending through the rubber stopper;

Fig. 2 is a top view of the container of Fig. 1;

Fig. 3 shows the final container, containing the lyophilic substance, and shows the method of using a hypodermic syringe to puncture the rubber stopper at the proper place;

Fig. 4 shows the finished container, when provided with an added sealing layer over the rubber stopper and projecting sealed glass tube; and Fig. 5 is a top view of the container of Fig. 4.

The container 1 may be an ordinary bottle or glass vial or receptacle of suitable size, such as a size containing a unit ration of the lyophilic material, or a larger container containing a larger bulk of the material.

The container is provided with the stopper 2 which has an opening extending therethrough, through which the glass tube 3 is shown as inserted. This glass tube, after the lyophilic product has been produced in a final evacuated state, is sealed at 4 to hold the product in the container under a vacuum.

The rubber stopper has a passage 5 extending from the bottom to a place near the top of the stopper, and a depression 6 at the top of the stopper, leaving a relatively thin, but adequate, portion of rubber between the passage 5 and the depression 6, thin enough to permit easy puncturing or perforation by the needle 9 of a hypodermic syringe 8, or by other similar needle, etc., but thick enough to withstand atmospheric pressure even where the container is highly evacuated.

The container of Fig. 4 is shown as provided with a sealing layer 10 of wax or other sealing material extending over the top of the projecting glass tube and stopper, and with an added thin layer of material 11, such as a strip of adhesive tape, arranged under the layer of sealing material and adapted to facilitate removal of this sealing layer and exposure of the depression 6 when it is desired to perforate the stopper.

In the use of the container, the liquid material to be converted into the lyophilic state is placed in the container and is rapidly frozen in accordance with the process of said prior application Serial No. 706,547, and the frozen material is then dehydrated in accordance with the process of said application after the stopper 2 has been inserted, with the glass tube 3 extending therethrough, through which the vacuum is applied. When the lyophilic product has been produced in its final lyophilic state, the tube 3 is sealed at 4, leaving the material in the sealed evacuated container.

When it is desired to use the material, the thin readily perforable portion of the stopper, between the depression 6 and the passage 5, enables ready access to be obtained, merely by inserting the needle through this thin portion of the stopper. The location of this portion is indicated by the depression 6, even though this depression may be coated with a thin layer of sealing material.

In the structure shown in Fig. 4, however, an added thin strip of material is applied over the depression 6, and the adjacent portion of the stopper, before the sealing layer is applied, so that the removal of this thin member 11, and of the sealing wax over it, will uncover the depression in the stopper, which will have been protected from infection by the sealing layer.

The rubber stopper itself can be readily prepared, of suitable soft rubber composition, adapted to insure effective sealing of the container. The passage 5 and the depression 6 will be made in the stopper at the time it is molded and vulcanized. By the use of such a stopper, an ordinary bottle can be made into an improved form of container, such as that above described.

The lyophilic material indicated at 7 in Figs. 3 and 4 is a material of the character described in said prior applications, which can be readily restored to a liquid state by the addition of water thereto. The holding of the material under a vacuum until the rubber stopper is perforated by a hypodermic needle, facilitates the restoration of the material when water is added thereto, so that the present improved container is well adapted for the preservation and storage of the lyophilic material, as well as for use in the restoration and administration of such materials, when desired.

I claim:

1. A container for lyophilic biologically active substances in the form of a glass bottle or vessel having an opening, a rubber stopper in said opening, a fixed glass tube extending through a passage in said stopper, said tube being open at the end extending into said bottle or vessel and sealed at the end protruding from said bottle or vessel, said stopper having a passage extending from the bottom thereof to a place near the top, and a depression in the top of the stopper opposite said passage, with a layer of rubber therebetween, which layer of rubber provides an easily perforable portion of said stopper, said container being evacuated and containing biologically active substances.

2. A container for desiccated biologically active substances in the form of a glass bottle or vessel having an opening, a rubber stopper in said opening, a fixed glass tube extending through a passage in said stopper, said tube being open at the end extending into said bottle or vessel and sealed at the end protruding from said bottle or vessel, said stopper having a passage extending from the bottom thereof to a place near the top, providing an easily perforable portion of said stopper, said container being evacuated and containing biologically active substances.

3. A container for lyophilic serum in the form of a glass bottle or vessel having an opening, a rubber stopper in said opening, a fixed glass tube extending through a passage in said stopper, said tube being open at the end extending into said bottle or vessel and sealed at the end protruding from said bottle or vessel, said stopper having a passage extending part way therethrough, providing an easily perforable portion of said stopper, said container being evacuated and containing lyophilic serum.

JOHN REICHEL.